United States Patent
Engel et al.

(10) Patent No.: US 10,230,806 B2
(45) Date of Patent: Mar. 12, 2019

(54) TRACKING OF USER INTERACTIONS

(71) Applicant: eBay Inc.

(72) Inventors: Dror Engel, San Jose, CA (US); Tea The Vinh Tran, Union City, CA (US); Shyamala Sriramulu, San Jose, CA (US); Zhiyi Jason Liu, San Jose, CA (US); Chandrashekar Basavaiah, San Ramon, CA (US)

(73) Assignee: eBay Inc., San Jose, CA (US)

(*) Notice: Subject to any disclaimer, the term of this patent is extended or adjusted under 35 U.S.C. 154(b) by 118 days.

(21) Appl. No.: 15/414,907

(22) Filed: Jan. 25, 2017

(65) Prior Publication Data
US 2017/0214758 A1 Jul. 27, 2017

Related U.S. Application Data

(60) Provisional application No. 62/286,740, filed on Jan. 25, 2016.

(51) Int. Cl.
*G06F 15/173* (2006.01)
*H04L 29/08* (2006.01)
*H04L 29/06* (2006.01)

(52) U.S. Cl.
CPC ............ *H04L 67/22* (2013.01); *H04L 67/306* (2013.01); *H04L 67/42* (2013.01)

(58) Field of Classification Search
USPC .................................. 709/217, 219, 223, 224
See application file for complete search history.

(56) References Cited

U.S. PATENT DOCUMENTS

| | | | | |
|---|---|---|---|---|
| 8,621,653 | B2* | 12/2013 | Khosravy | G06Q 50/10 340/8.1 |
| 2010/0241684 | A1* | 9/2010 | Cheng | G06Q 10/10 709/202 |
| 2011/0083069 | A1* | 4/2011 | Paul | G06F 8/60 715/234 |
| 2012/0036494 | A1* | 2/2012 | Gurumohan | G06Q 10/103 717/106 |
| 2012/0159541 | A1* | 6/2012 | Carton | H04N 21/2343 725/34 |
| 2013/0252649 | A1* | 9/2013 | Siomina | H04W 4/02 455/466 |
| 2013/0254262 | A1* | 9/2013 | Udall | H04L 67/42 709/203 |
| 2013/0297698 | A1* | 11/2013 | Odero | H04L 69/24 709/204 |
| 2015/0288644 | A1* | 10/2015 | El Daher | H04L 51/32 709/206 |
| 2015/0379554 | A1* | 12/2015 | Copeland | G06Q 30/0239 705/14.39 |
| 2017/0169128 | A1* | 6/2017 | Batchu Krishnaiahsetty | H04N 1/32122 |

* cited by examiner

*Primary Examiner* — Liang Che A Wang
(74) *Attorney, Agent, or Firm* — Schwegman Lundberg & Woessner, P.A.

(57) ABSTRACT

System and methods for tracking of user interactions are disclosed. A server system receives a first user interaction record from a first client device. The server system receives a second user interaction record from a second client device, wherein the first user interaction record and the second user interaction record are both formatted using a multi-platform user interaction data record format. The server system stores the first user interaction record and the second user interaction record at a database at the server system.

20 Claims, 8 Drawing Sheets

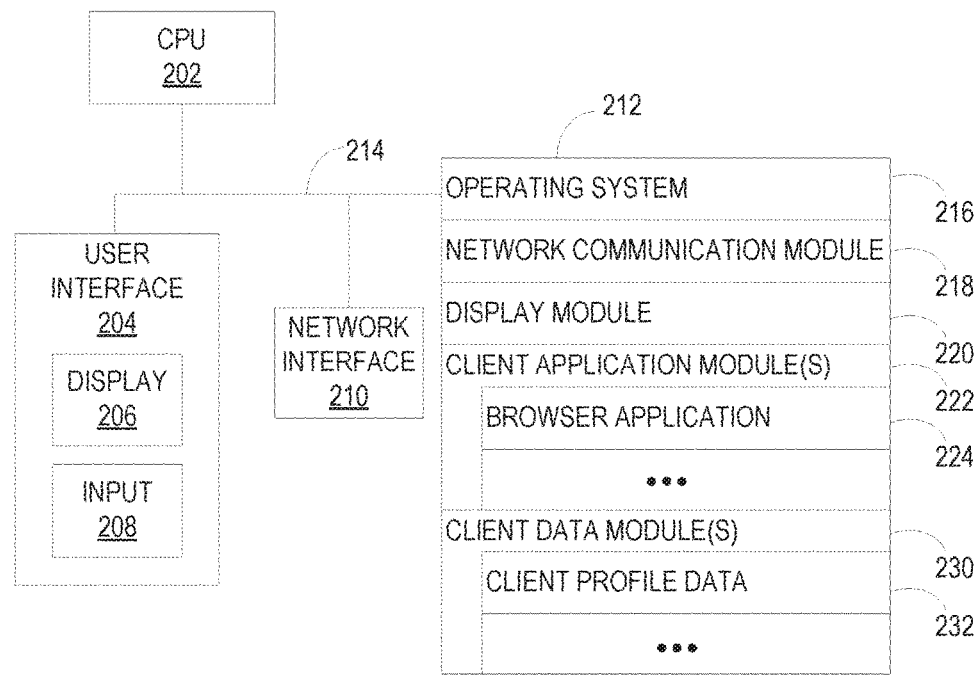
FIG. 2

TRACKING OF USER INTERACTIONS

CLAIM OF PRIORITY

This application claims the benefit of priority of U.S. Application No. 62/286,740, filed Jan. 25, 2016, which is hereby incorporated by reference in its entirety.

TECHNICAL FIELD

Embodiments of the present disclosure relate generally to data analysis and, more particularly, but not by way of limitation, to tracking user interactions.

BACKGROUND

The rise in electronic and digital device technology has rapidly changed the way society interacts with media and consumes goods and services. Digital technology enables a variety of consumer devices to be available that are very flexible and relatively cheap. Specifically, modern electronic devices, such as smartphones and tablets, allow a user to have access to a variety of useful applications even when away from a traditional computer.

The widespread proliferation of electronic devices also results in the generation of a large amount of data. However, because this information is generated over a large number of different devices and/or platforms, effectively collecting and integrating data can be difficult.

BRIEF DESCRIPTION OF THE DRAWINGS

Various ones of the appended drawings merely illustrate example embodiments of the present disclosure and cannot be considered as limiting its scope.

FIG. 2 is a block diagram further illustrating the client device, in accordance with some example embodiments.

DETAILED DESCRIPTION

The description that follows includes systems, methods, techniques, instruction sequences, and computing machine program products that embody illustrative example embodiments of the disclosed subject matter. In the following description, for the purposes of explanation, numerous specific details are set forth in order to provide an understanding of various example embodiments of the disclosed subject matter. It will be evident, however, to those skilled in the art, that embodiments of the inventive subject matter may be practiced without these specific details. In general, well-known instruction instances, protocols, structures, and techniques are not necessarily shown in detail.

Network-based services (e.g., any computer service available over a computer network, such as a website) constantly receive information from client devices. Some of this information represents user interactions with the client device or the network-based service(s). Collecting and analyzing data describing user actions (or interactions) allows these services to understand the needs of its users and better serve those users.

However, as devices that are capable of accessing network-based services become more varied and use an increasing number of platforms, it is difficult to collect user interaction data from the various devices and change that data into a format that can be combined with user interaction records from other client devices.

In some example embodiments, a server system acts as a single collection point for all such user interaction data for a particular network-based service (e.g., an online commerce website). The server system provides a single application program interface such that all devices have a single point of content to which all user interaction data is sent, regardless of the type of device or the platform/operating system the device is running.

To enable a single API to service a plurality of device types and platforms, the user interaction data has a common format. Thus, each user interaction is stored in a user interaction record that includes, among other data, the user who performed the action (if known), the type of action, the target of the action, the source of the action (the client device), the time of the action, and so on.

Once a user interaction record is received at the server system, the server system then is able to store the user interaction record in a user interaction database without having to significantly convert or adjust the data to fit well with data from other devices. This database can then be analyzed or queried to identify trends, patterns, and so on.

Figure 1:
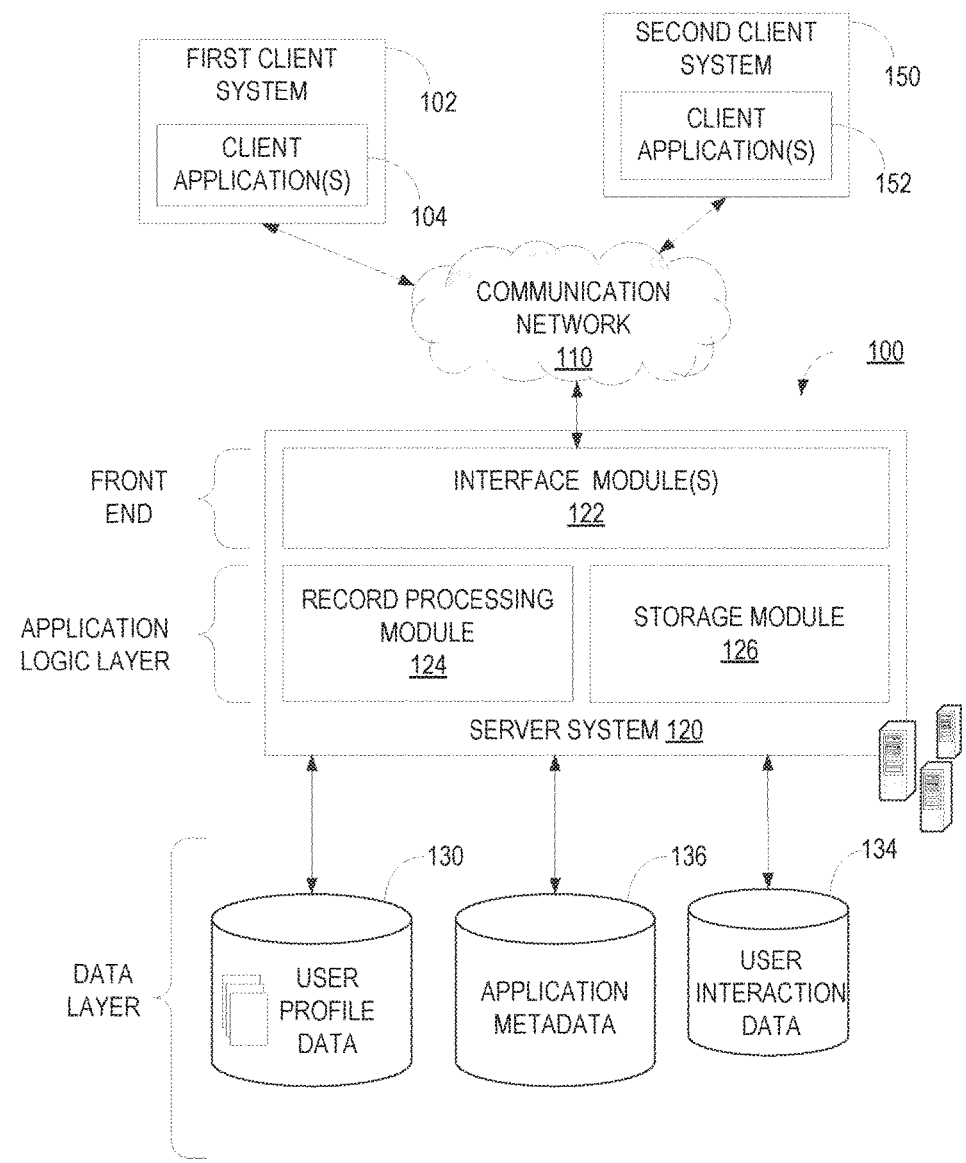
FIG. 1 is a network diagram depicting a client-server system environment that includes various functional components of a server system, in accordance with some example embodiments.

FIG. 1 is a network diagram depicting a client-server system environment 100 that includes various functional components of a server system 120, in accordance with some example embodiments. The client-server system environment 100 includes at least a first client system 102, a second client system 150, and a server system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, a first client system 102 is an electronic device, such as a personal computer (PC), a laptop, a smartphone, a tablet, a mobile phone, or any other electronic device capable of communication with a communication network 110. The first client system 102 includes one or more client applications 104, which are executed by the first client system 102. In some example embodiments, the client application(s) 104 include one or more applications from a set consisting of search applications, communication applications, productivity applications, game applications, word processing applications, or any other useful applications. The client application(s) 104 include a web browser. The first client system 102 uses a web browser to send and receive requests to and from the server system 120 and displays information received from the server system 120.

In some example embodiments, the first client system 102 includes an application specifically customized for communication with the server system 120 (e.g., a LinkedIn iPhone application). In some example embodiments, the server system 120 is a server system that is associated with one or more services.

In some example embodiments, the first client system 102 sends a request to the server system 120 for a webpage associated with the server system 120. For example, a member uses a first client system 102 to log into the server system 120 and clicks a link to view a job listing for a job they are interested in from server system 120. In response, the first client system 102 receives the requested job listing data (e.g., data describing the position, the associated organization, the job requirements, and responsibilities) and displays that data in a user interface on the first client system 102.

In some example embodiments, the second client system 150 is a computer system that has a different form factor or platform than the first client system 102 (e.g., if the first client system 102 is a laptop running Windows, the second client system 150 is a wearable electronic device running a customized operating system.).

In some example embodiments, as shown in FIG. 1, the server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-tiered architecture, the various example embodiments are by no means limited to this architecture.

As shown in FIG. 1, the front end consists of an interface module(s) (e.g., a web server) 122, which receives user interaction records from various client systems 102 and 150 and communicates the user interaction records to the appropriate application module. In some example embodiments, the interface module(s) 122 implements a single application programmatic interface (API) with which all client systems communicate to transmit user interaction records, regardless of device type, operating system, or platform.

As shown in FIG. 1, the data layer includes several databases, including databases for storing various data for users of the server system 120, including user profile data 130, application metadata 136, and user interaction data 134.

In some example embodiments, the user profile data 130 includes data including both data provided by the user, who may be prompted to provide some personal information when interacting with the server system 120 such as his or her name, age (e.g., birth date), gender, interests, contact information, home town, address, educational background (e.g., schools, majors), current job title, job description, industry, employment history, skills, professional organizations, memberships to other social networks, customers, past business relationships, and seller preferences; and inferred user information based on user activity, social graph data, and so on.

User interaction data 134 includes a series of interaction records detailing any interaction a user has with a website (e.g., a network-based commerce site) hosted by or affiliated with the server system 120. User interactions include clicks, likes, views, ratings, purchases, bids, mouse hovering, view times, up or down votes, star ranks, and so on.

In some example embodiments, the application metadata 136 describes, for a plurality of devices, users, system, and so on, the type of data and data fields that is expected and the format that the data and or data fields must take. For example, the data that is expected from a mobile device may be different from the data that is expected from a desktop computer. The system metadata 136 defines, for a plurality of systems and use cases what type of data is expected and, at least in some cases, data that is required.

For example, an interaction record from a mobile phone can require a device ID number that would not available for a web connected device. Similarly, each data field can require a particular type of data. For example, if the data field is for an age, the system metadata may require that the input be a integer. In other example embodiments, the system metadata may require that the number be within a certain range (e.g., 1-110).

The server system 120 may provide a broad range of other applications and services that allow users the opportunity to buy and sell items, share and receive information, often customized to the interests of the member, and so on.

In some example embodiments, the application logic layer includes various application server modules, which, in conjunction with the interface module(s) 122, receive user interaction data 134 from a plurality of user interaction records from a large variety of client systems (102, 150, and so on) and stores the information in a user interaction data storage.

A record processing module 124 and a storage module 126 can also be included in the application logic layer. Of course, other applications or services that utilize the record processing module 124 or the storage module 126 may be separately implemented in their own application server modules.

As illustrated in FIG. 1, with some example embodiments, the record processing module 124 or the storage module 126 are implemented as services that operate in conjunction with various application server modules. For instance, any number of individual application server modules can invoke the functionality of the record processing module 124 or the storage module 126. However, with various alternative example embodiments, the record processing module 124 or the storage module 126 may be implemented as their own application server modules such that they operate as stand-alone applications.

Generally, the record processing module 124 receives user interaction records from the interface module(s) 122. In some example embodiments, the user interaction records are formatted into a common interaction format that remains constant regardless of the client device from which the user interaction record is received.

In some example embodiments, the user interaction records include information identifying the user with whom the interaction record is associated. The record processing module 124 then accesses the user profile data 130 to access additional information about the user that might be useful when analyzing the user interaction.

In other example embodiments, the user interaction record already includes all the relevant user information. The record processing module 124 records the time and source of the user interaction record (if not already included in the record) and passes the user interaction record to the storage module 126.

In some example embodiments, the storage module 126 receives the user interaction record from the record processing module 124 and either stores it directly in the user interaction data 134 or converts it to an acceptable form for storage. In some example embodiments, any personally identifiable information (e.g., information that would identify a particular person) is removed before the record is added to the user interaction data 134.

FIG. 2 is a block diagram further illustrating the first client system 102, in accordance with some example embodiments. The first client system 102 typically includes one or more central processing units (CPUs) 202, one or more network interfaces 210, memory 212, and one or more communication buses 214 for interconnecting these components. The first client system 102 includes a user interface 204. The user interface 204 includes a display device 206 and optionally includes an input device 208 such as a keyboard, mouse, touch sensitive display, or other input means. Furthermore, some client systems use a microphone and voice recognition to supplement or replace other input devices.

The memory 212 includes high-speed random access memory, such as dynamic random-access memory (DRAM), static random access memory (SRAM), double data rate random access memory (DDR RAM) or other random access solid state memory devices, and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for coupling the first client system 102 to other computers via the one or more network interfaces 210 (wired or wireless) and one or more communication networks 110, such as the Internet, other WANs, LANs, MANs, etc.;
- a display module 220 for enabling the information generated by the operating system 216 and the client application(s) 104 to be presented visually on the display device 206;
- one or more client application modules 222 for handling various aspects of interacting with the server system 120 (FIG. 1), including but not limited to:
    - a browser application 224 for requesting information from a web service associated with the server system 120 (e.g., content items and listings) and receiving responses from the web service associated with the server system 120; and
- client data module(s) 230 for storing data relevant to the clients, including but not limited to:
    - client profile data 232 for storing profile data related to a user of the server system 120 associated with the client system 102.

Figure 3:
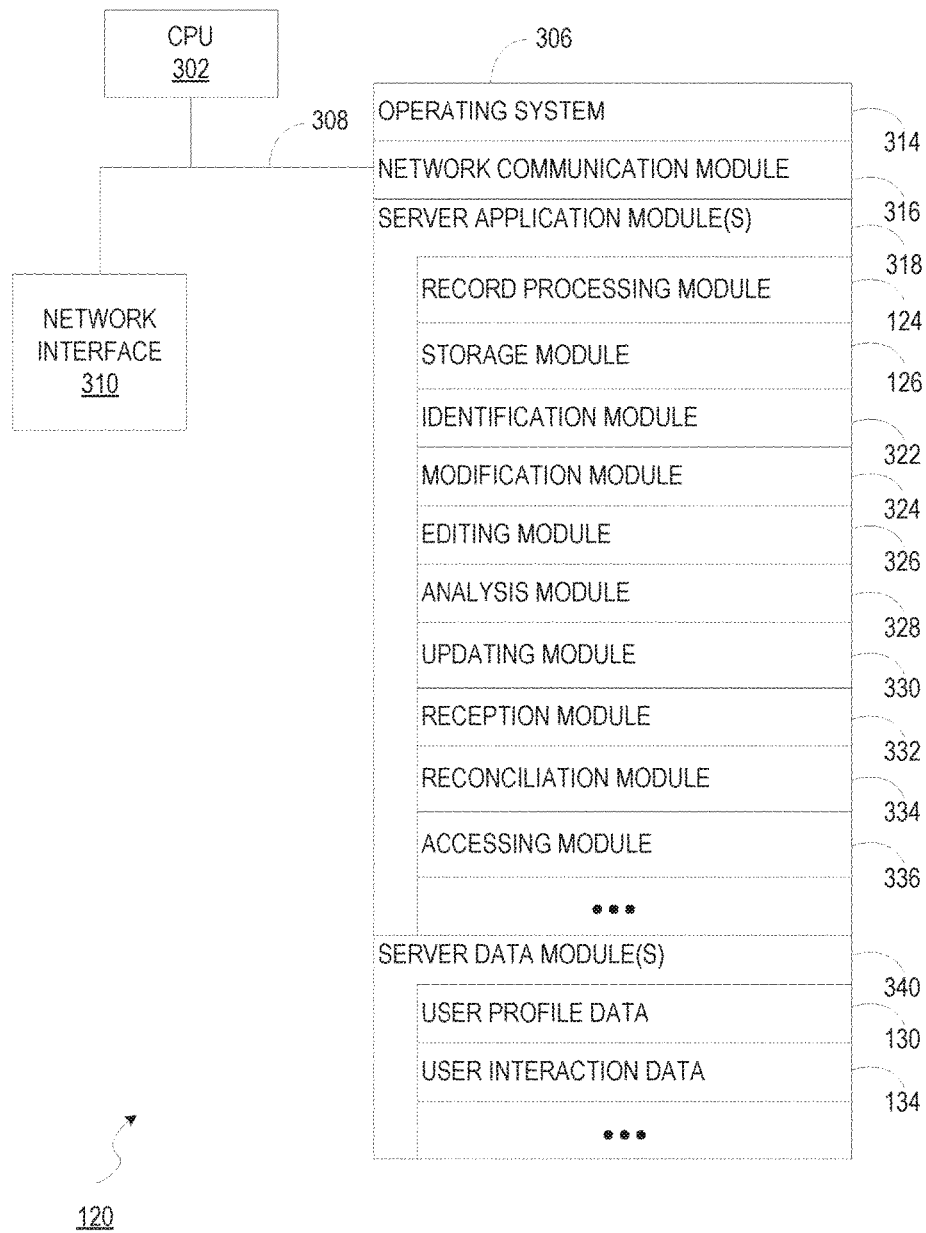
FIG. 3 is a block diagram further illustrating the server system, in accordance with some example embodiments.

FIG. 3 is a block diagram further illustrating the server system 120, in accordance with some example embodiments. The server system 120 typically includes one or more CPUs 302, one or more network interfaces 310, memory 306, and one or more communication buses 308 for interconnecting these components. The memory 306 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternately the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for coupling the server system 120 to other computers via the one or more network interfaces 310 (wired or wireless) and one or more communication networks 110, such as the Internet, other WANs, LANs, MANs, and so on;
- one or more server application modules 318 configured to perform the services offered by the server system 120, including but not limited to:
    - a record processing module 124 for receiving user interaction records, identifying a particular user associated with the record, accessing data associated with the identified user, and supplementing the user interaction record with user profile data 130;
    - a storage module 126 for storing user interaction records in user interaction data 134;
    - an identification module 322 for identifying one or more users associated with a particular user interaction record;
    - a modification module 324 for modifying a user interaction record to include information concerning the user associated with the user interaction record;
    - an editing module 326 for editing a user interaction record to remove personally identifiable information;
    - an analysis module 328 for analyzing stored user interaction data 134 to identify user trends and patterns based on stored user interactions;
    - an updating module 330 for updating a user feedback image based on received user feedback for a product;
    - a reception module 332 for receiving user interaction records, each user interaction record associated with a particular user interaction with a network-based service;
    - a reconciliation module 334 for taking user interaction records received from a variety of client devices and ensuring that the data associated with each record can be integrated into the interaction record data; and an accessing module 336 for accessing user profile data 130 to supplement a user interaction record; and server data module(s) 340, storing data related to the server system 120, including but not limited to:

user profile data 130, including both data provided by the user, who will be prompted to provide some personal information, such as his or her name, age (e.g., birth date), gender, interests, contact information, home town, address, educational background (e.g., schools, majors), current job title, job description, industry, employment history, skills, professional organizations, customers, past business relationships, and seller preferences; and inferred user information based on user activity, social graph data, and so on; and user interaction data 134 for storing user interaction records for a plurality of users and received from a plurality of different client systems (e.g., the first client system 102 in FIG. 1).

Figure 4:
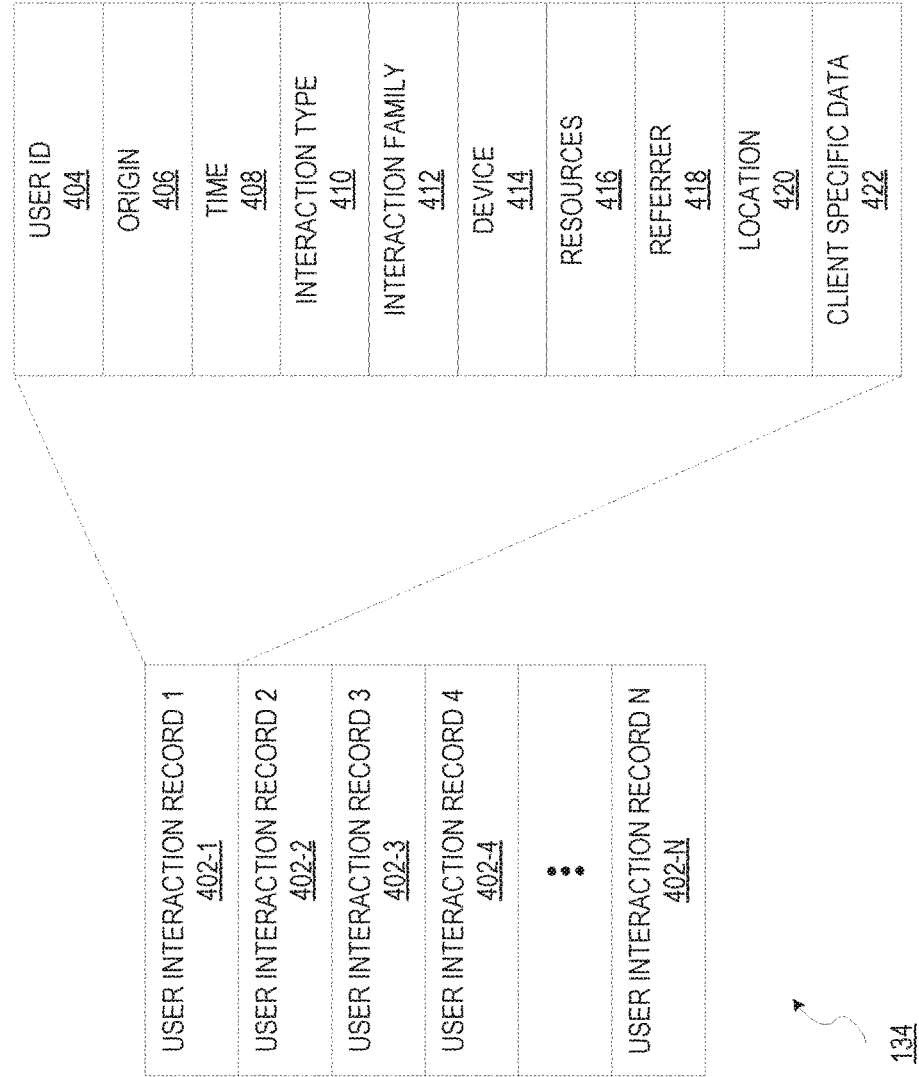
FIG. 4 depicts a block diagram of an exemplary data structure for storing user interaction records in accordance with some example embodiments.

FIG. 4 depicts a block diagram of an example data structure for storing user interaction records in accordance with some example embodiments. In accordance with some example embodiments, the user profile data 134 includes a plurality of user interaction records 402-1 to 402-N (also referred to as user interaction record(s) 402), each of which corresponds to a particular user interaction with a network-based service associated with the server system (e.g., the server system 120 in FIG. 1).

In some example embodiments, a particular user interaction record 402 includes a user ID 404 (e.g., an identifier for a particular user of the server system (e.g., the server system 120 in FIG. 1), an origin value 406 (e.g., a identifier of the service through which the interaction was received), a time 408, an interaction type 410 (e.g., details of the interaction), an interaction family 412 (e.g., the general category into which the interaction falls), a device 414 (e.g., an identifier for the particular device from which the interaction record was received), a list of resources (e.g., a list identifying the resources available at the client device associated with the user interaction record 402), a referrer 418 (e.g., a value representing a particular referrer of the user prior to the interaction), a location 420 (e.g., the IP address or physical location of the client device associated with the user), and client specific data 422 (e.g., any data gathered by a client system (e.g., the client system 102 in FIG. 1) that is unique to that particular system and can't be fit into the existing user interaction record).

Figure 5:
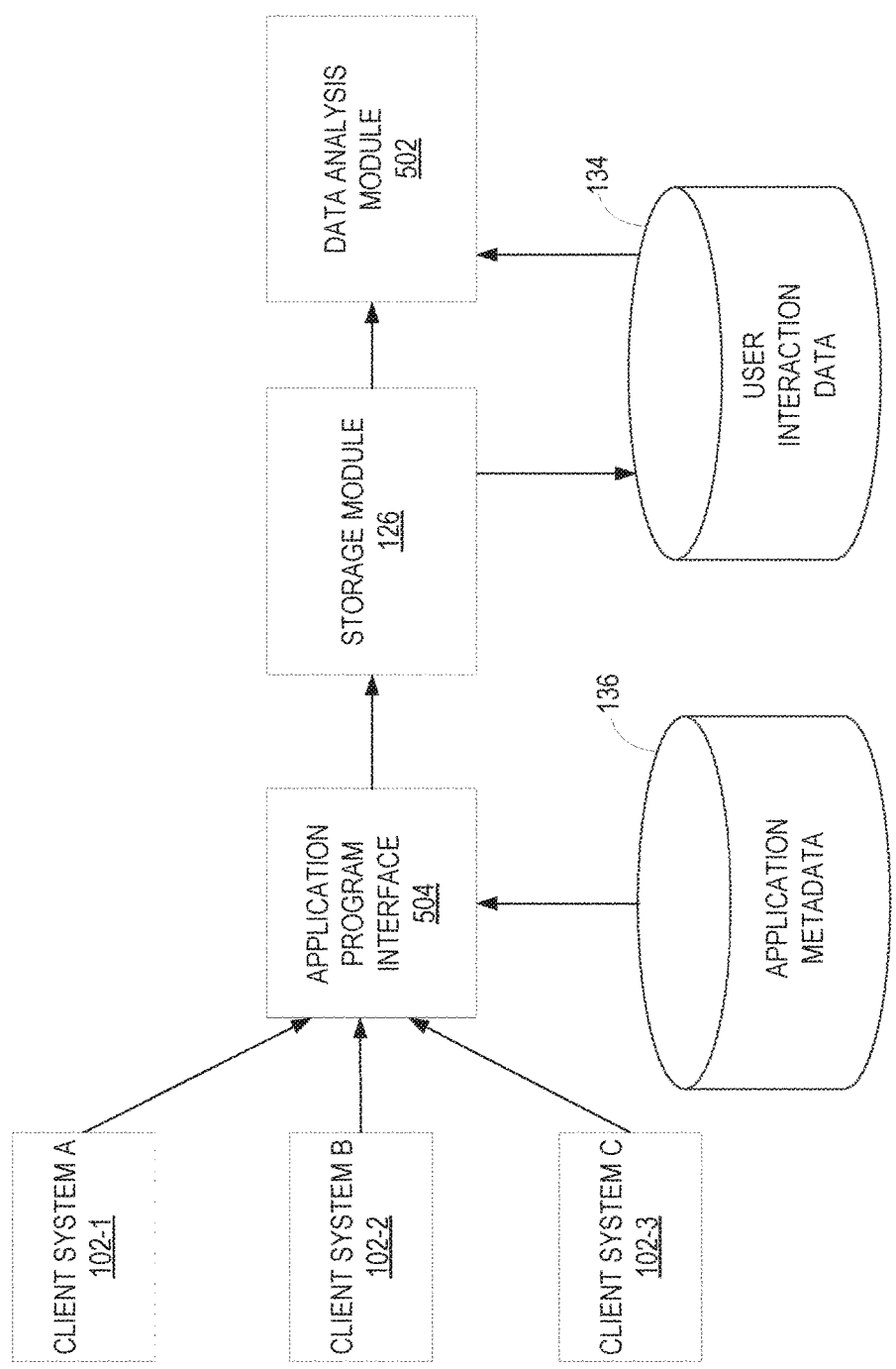
FIG. 5 illustrates a flow diagram for a method of tracking of user interactions over a variety of devices at a single recording point.

FIG. 5 illustrates a flow diagram for a method of tracking user interactions over a variety of devices at a single recording point. In this example, a plurality of client systems (client systems A, B, and C 102-1 to 102-3) allow a user to access one or more network-based services (e.g., search, messaging, commerce and so on). For example, each client device (e.g., the client device 102 in FIG. 1) runs a web browser that allows the user to buy books from an online service or search for movie show times. In some example embodiments, the client system 102 includes a dedicated application for a particular network-based service.

In some example embodiments, each client system (102-1 to 102-3) collects data about the user's interaction with a particular web service either through a dedicated application or through a web browser. In some example embodiments, user interactions can include what the user clicks on, what the user views, what the user hovers the user's mouse over, and so on.

In some example embodiments, the client system 102 records each user interaction in a user interaction record. Regardless of the device type or the platform, the user interaction records are standardized. Then, each device transmits that record to a single application program interface 504. Because the user interaction record is standardized, a single application program interface 504 can be used by all possible devices.

In some example embodiments, the application program interface 504 accesses the application metadata 136. The application metadata 136 includes information that details what data fields to expect from different types of client devices, what format the data each data field requires or expects, and the instructions for converting information received from a variety of devices inot a standard interaction record (if such conversion is necessary). The application program interface 504 can then determine whether received information matches the expected information based on the application metadata.

The application program interface 504 then transmits each user interaction record to the storage module 126. In some example embodiments, the storage module 126 then prepares the user interaction record for storage in the user interaction data 134. In some example embodiments, the storage module 126 modifies the user interaction records before storing them in the user interaction data 134. For example, the storage module 126 removes the personally identifiable information from the user interaction record such that the information can still be used for analysis but no particular user can be identified.

In some example embodiments, a data analysis module 502 can then be used to determine one or more trends or patterns in the user interaction data 134 (e.g., which items are the most popular with certain groups, what news items are considered the more liked or trustworthy, and so on).

Figure 6:
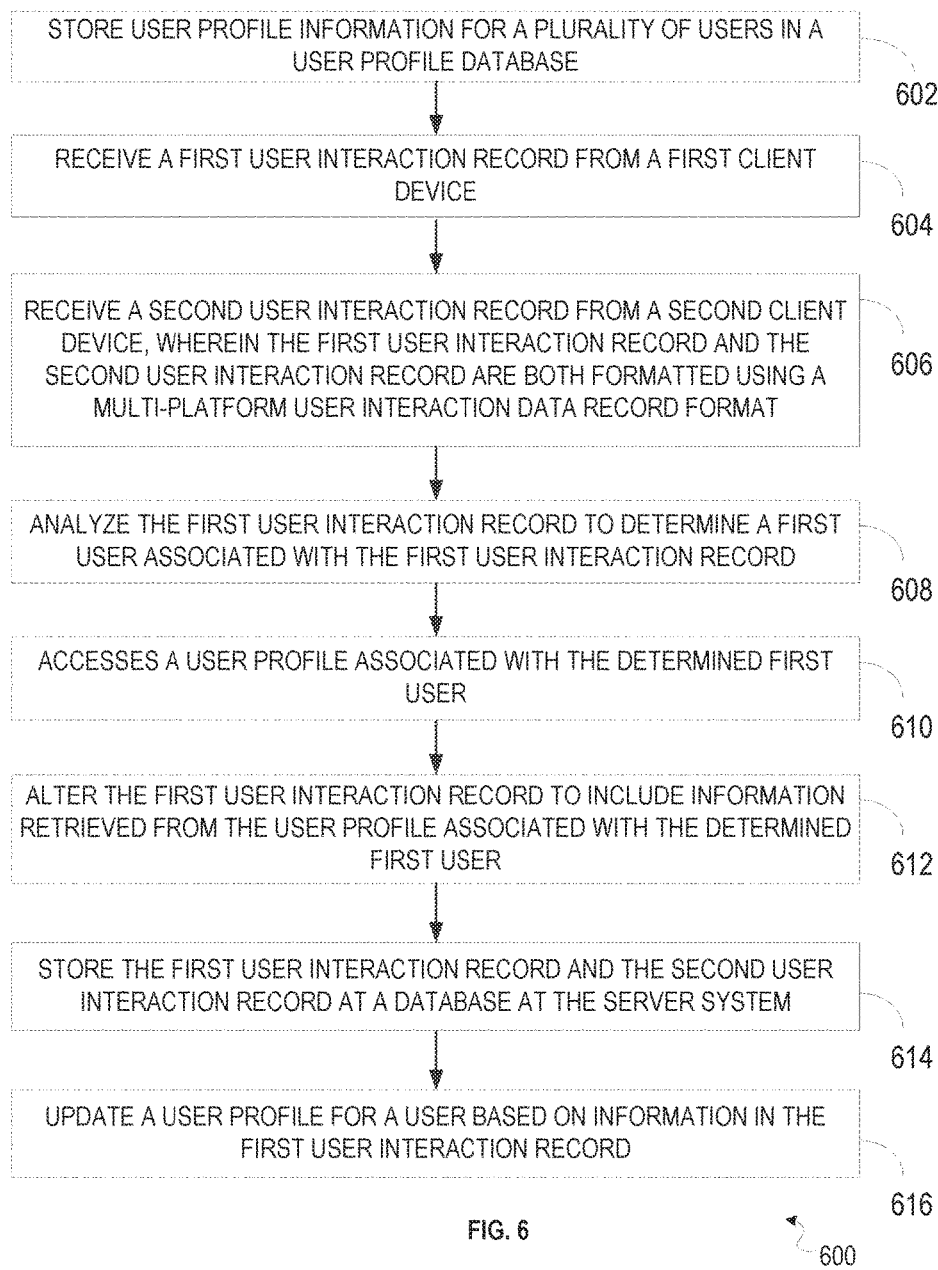
FIG. 6 is a flow diagram illustrating a method, in accordance with some example embodiments, for of tracking of user interactions over a variety of devices at a single recording point.

FIG. 6 is a flow diagram illustrating a method 600, in accordance with some example embodiments, for of tracking user interactions over a variety of devices at a single recording point. Each of the operations shown in FIG. 6 may correspond to instructions stored in a computer memory or computer-readable storage medium. Optional operations are indicated by dashed lines (e.g., boxes with dashed-line borders). In some embodiments, the method 600 described in FIG. 6 is performed by the server system (e.g., the server system 120 in FIG. 1). However, the method 600 can also be performed by any other suitable configuration of electronic hardware.

In some embodiments the method 600 is performed at a server system (e.g., the server system 120 in FIG. 1) including one or more processors and memory storing one or more programs for execution by the one or more processors.

In some example embodiments, the server system (e.g., the server system 120 in FIG. 1) stores (602) user profile information for a plurality of users in a user profile database. For example, each user of the server system has a user profile stored at the server system. A user profile can include information such as the user's name, age (e.g., birth date), gender, interests, contact information, home town, address, educational background (e.g., schools, majors), current job title, job description, industry, employment history, skills, professional organizations, customers, past business relationships, and seller preferences; and inferred user information based on user activity, social graph data, and so on.

In some example embodiments, the server system (e.g., the server system 120 in FIG. 1) receives (604) a first user interaction record from a first client device (e.g., first client device 102). In some example embodiments, the first user interaction record is transmitted to the server system (e.g., the server system 120 in FIG. 1) over a computer network via an application program interface (API) made available by the server system for the purpose of providing a single point to which all user interaction records are to be delivered regardless of where they originate.

In some example embodiments, the server system (e.g., the server system 120 in FIG. 1) identifies a device type associated with the first client device. Device types include desktop devices, mobile devices (e.g., smartphones, tablets), smart watches, devices that are enabled as part of the internet of things (such as home appliances), wearable computing devices, and so on.

In some example embodiments, the server system (e.g., the server system 120 in FIG. 1) retrieves device specific metadata for the identified device type associated with the first client device, wherein the metadata identifies at least one required data field. For example, smartphones may transmit a device identification number but a web connected desktop may not.

In some example embodiments, the server system (e.g., the server system 120 in FIG. 1) uses the device specific metadata to evaluate the first user interaction record to determine whether the required data fields are included.

In some example embodiments, the server system (e.g., the server system 120 in FIG. 1) receives (606) a second user interaction record from a second client device (e.g., second client device 150), wherein the first user interaction record and the second user interaction record are both formatted using a multi-platform user interaction data record format. In some example embodiments, the multi-platform user interaction data record format is an interaction data record format that is used across a plurality of devices and platforms and includes a standard set of data fields (e.g., user, location, time, interaction time, and so on) as well as device-specific data fields.

In some example embodiments, the first client device is a different device type than the second client device. For example, the first client device is a laptop and the second client device is a smart watch. In some example embodiments, the first client device uses a different software platform than the second client device. For example, the first client device is a desktop computer running a web browser to access the network-based service and the second client device is a tablet computer that accesses the network-based service through a dedicated application.

In some example embodiments, the server system (e.g., the server system 120 in FIG. 1) analyzes (608) the first user interaction record to determine a first user associated with the first user interaction record. For example, the first user interaction record includes a user ID (as illustrated in FIG. 4) that allows the server system (e.g., the server system 120 in FIG. 1) to identify a particular user profile in a database of user profiles.

In some example embodiments, the server system (e.g., the server system 120 in FIG. 1) accesses (610) a user profile associated with the determined first user. For example, the server system uses the identified user ID to access the associated user profile.

In some example embodiments, the server system (e.g., the server system 120 in FIG. 1) alters (612) the first user interaction record to include information retrieved from the user profile associated with the determined first user. For example, user names or locations (e.g., IPs) are removed and only demographic information is left to allow for analysis of the collected user interaction data.

In some example embodiments, the server system (e.g., the server system 120 in FIG. 1) stores (614) the first user interaction record and the second user interaction record at a database at the server system.

In some example embodiments, the server system (e.g., the server system 120 in FIG. 1) updates (616) a user profile for a user based on information in the first user interaction record.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
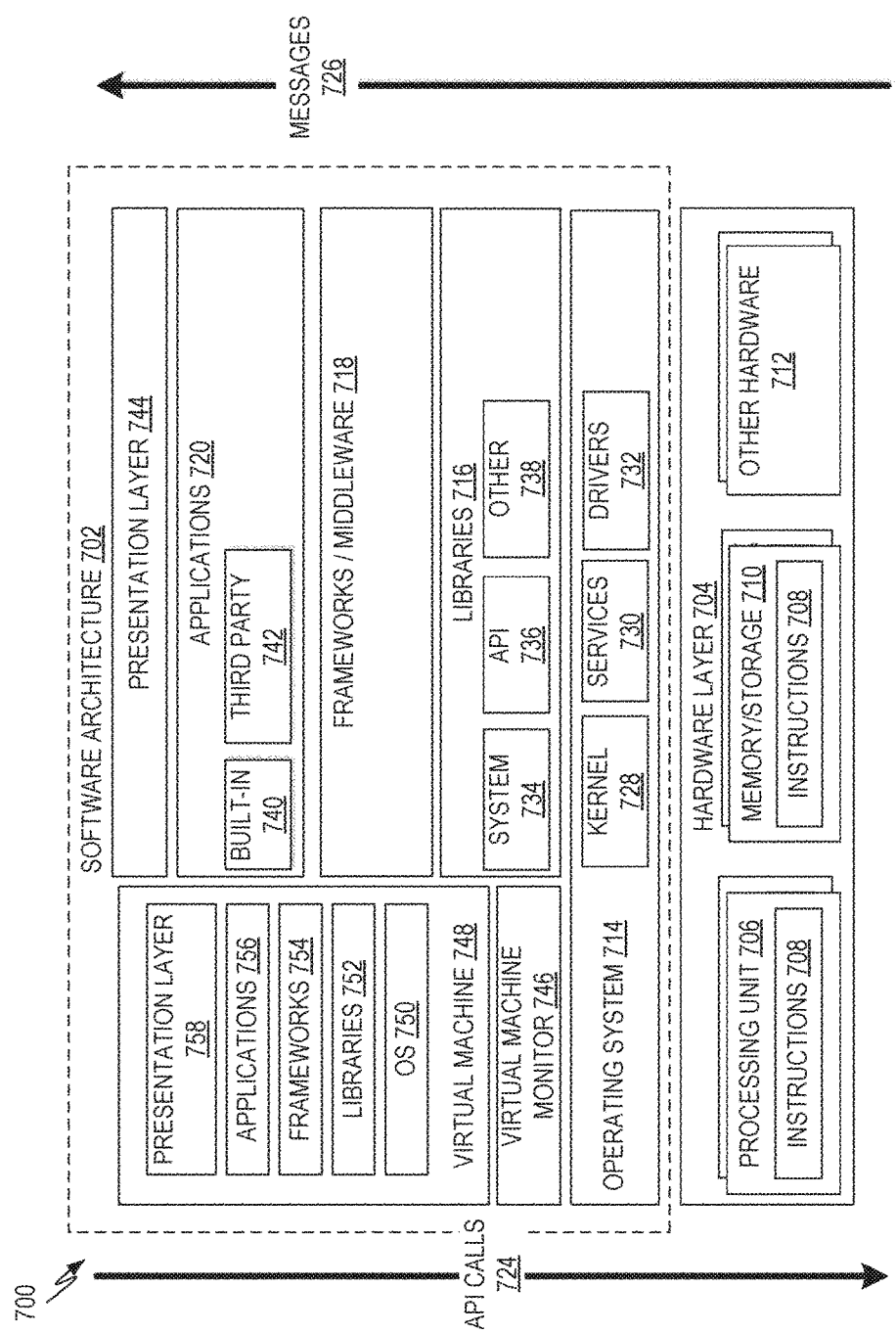
FIG. 7 is a block diagram illustrating an example of a software architecture that may be installed on a machine, according to some example embodiments.

FIG. 7 is a block diagram 700 illustrating a representative software architecture 702, which may be used in conjunction with various hardware architectures herein described. FIG. 7 is merely a non-limiting example of a software architecture 702 and it will be appreciated that many other architectures may be implemented to facilitate the functionality described herein. The software architecture 702 may be executing on hardware such as a machine 800 of FIG. 8 that includes, among other things, processors 810, memory/storage 830, and I/O components 850. A representative hardware layer 704 is illustrated in FIG. 7 and can represent, for example, the machine 800 of FIG. 8. The representative hardware layer 704 comprises one or more processing units 706 having associated executable instructions 708. The executable instructions 708 represent the executable instructions of the software architecture 702, including implementation of the methods, modules, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth, illustrated as messages 726, in response to the API calls 724. The layers illustrated are representative in nature and not all software architectures have all layers. For example, some mobile or special purpose operating systems may not provide a frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 or other software components/modules, some of which may be specific to a particular operating system or platform.

The applications 720 include built-in applications 740 or third party applications 742. Examples of representative built-in applications 740 may include, but are not limited to, a contacts application, a browser application, a book reader application, a location application, a media application, a messaging application, or a game application. The third party applications 742 may include any of the built in applications 740 as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows' Phone, or other mobile operating systems. In this example, the third party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), and frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware machine (e.g., the machine 800 of FIG. 8). A virtual machine is hosted by a host operating system (e.g., operating system 714) and typically, although not always, has a virtual machine monitor 746, which manages the operation of the virtual machine 748 as well as the interface with the host operating system (e.g., operating system 714). A software architecture executes within the virtual machine 748 such as an operating system 750, libraries 752, frameworks 754, applications 756, or presentation layer 758. These layers of software architecture executing within the virtual machine 748 can be the same as corresponding layers previously described or may be different.

Example Machine Architecture and Machine-Readable Medium

Figure 8:
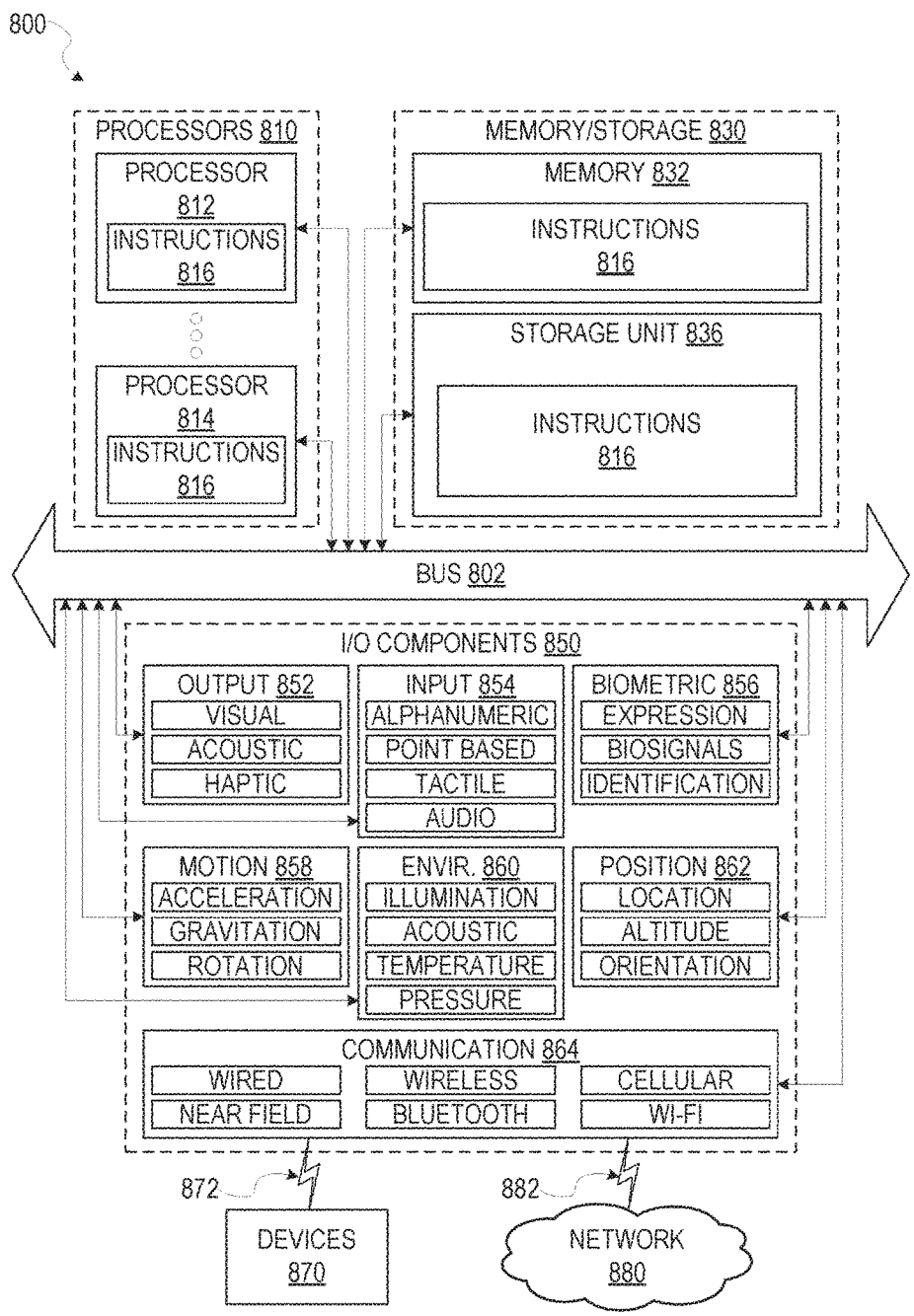
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the flow diagrams of FIGS. 5-6. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include a multi-core processor that may comprise two or more independent processors (sometimes referred to as "cores") that may execute the instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and the memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a server system, a first user interaction record from a first client device;
   receiving, at the server system, a second user interaction record from a second client device, wherein the first user interaction record and the second user interaction record are both formatted using a multi-platform user interaction data record format;
   storing the first user interaction record and the second user interaction record at a database at the server system;
   analyzing the first user interaction record to determine a first user associated with the first user interaction record;
   accessing a user profile associated with the determined first user;
   altering the first user interaction record to remove personally identifiable information from the user profile associated with the determined first user, and updating the user profile for the first user based on the first user interaction record stored in the database at the server system.

2. The method of claim 1, wherein the first client device is a different device type than the second client device.

3. The method of claim 1, wherein the first client device uses a different software platform than the second client device.

4. The method of claim 1, further comprising:
prior to storing the first user interaction record, identifying a device type associated with the first client device; and
retrieving device specific metadata for the identified device type associated with the first client device, wherein the metadata identifies at least one required data field.

5. The method of claim 4, further comprising:
using the device specific metadata to evaluate the first user interaction record to determine whether the at least one required data field is present in the first user interaction record.

6. The method of claim 1, further comprising:
altering the first user interaction record to include information retrieved from the user profile associated with the determined first user.

7. The method of claim 1, further comprising:
storing user profile information for a plurality of users in a user profile database.

8. A server system comprising:
one or more computer processors; and
one or more computer-readable mediums that, when executed by the one or more computer processors, cause the server system to perform operations comprising:
receiving a first user interaction record from a first client device;
receiving a second user interaction record from a second client device, wherein the first user interaction record and the second user interaction record are both formatted using a multi-platform user interaction data record format;
storing the first user interaction record and the second user interaction record in a database of the server system;
analyzing the first user interaction record to determine a first user associated with the first user interaction record;
accessing a user profile associated with the determined first user;
altering the first user interaction record to remove personally identifiable information from the user profile associated with the determined first user, and
updating the user profile for the first user based on the first user interaction record stored in the database of the server system.

9. The server system of claim 8, wherein the first client device is a different device type than the second client device.

10. The server system of claim 8, wherein the first client device uses a different software platform than the second client device.

11. The server system of claim 8, the operations further comprising:
prior to storing the first user interaction record, identifying a device type associated with the first client device; and
retrieving device specific metadata for the identified device type associated with the first client device, wherein the metadata identifies at least one required data field.

12. The server system of claim 11, the operations further comprising:
using the device specific metadata to evaluate the first user interaction record to determine whether the at least one required data field is present in the first user interaction record.

13. The server system of claim 8, the operations further comprising:
altering the first user interaction record to include information retrieved from the user profile associated with the determined first user.

14. The server system of claim 8, the operations further comprising:
storing user profile information for a plurality of users in a user profile database.

15. A non-transitory computer-readable medium that, when executed the one or more computer processors of a server system, cause the server system to perform operations comprising:
receiving a first user interaction record from a first client device;
receiving a second user interaction record from a second client device, wherein the first user interaction record and the second user interaction record are both formatted using a multi-platform user interaction data record format;
storing the first user interaction record and the second user interaction record in a database of the server system;
analyzing the first user interaction record to determine a first user associated with the first user interaction record;
accessing a user profile associated with the determined first user;
altering the first user interaction record to remove personally identifiable information from the user profile associated with the determined first user, and
updating the user profile for the first user based on the first user interaction record stored in the database of the server system.

16. The non-transitory computer-readable medium of claim 15, wherein the first client device is a different device type than the second client device.

17. The non-transitory computer-readable medium of claim 15, wherein the first client device uses a different software platform than the second client device.

18. The non-transitory computer-readable medium of claim 15, the operations further comprising:
prior to storing the first user interaction record, identifying a device type associated with the first client device; and
retrieving device specific metadata for the identified device type associated with the first client device, wherein the metadata identifies at least one required data field.

19. The non-transitory computer-readable medium of claim 18, the operations further comprising:
using the device specific metadata to evaluate the first user interaction record to determine whether the at least one required data field is present in the first user interaction record.

20. The non-transitory computer-readable medium of claim 15, the operations further comprising:

altering the first user interaction record to include information retrieved from the user profile associated with the determined first user.

\* \* \* \* \*

UNITED STATES PATENT AND TRADEMARK OFFICE
CERTIFICATE OF CORRECTION

PATENT NO. : 10,230,806 B2
APPLICATION NO. : 15/414907
DATED : March 12, 2019
INVENTOR(S) : Dror Engel et al.

It is certified that error appears in the above-identified patent and that said Letters Patent is hereby corrected as shown below:

In the Claims

In Column 20, Line 22, in Claim 15, after "executed" insert -- by --.

Signed and Sealed this
Twenty-first Day of July, 2020

Andrei Iancu
*Director of the United States Patent and Trademark Office*